United States Patent [19]

Anderson et al.

[11] 4,105,473

[45] Aug. 8, 1978

[54] METHOD OF PROTECTING AN ALUMINUM BRAKING SURFACE

[75] Inventors: Arnold E. Anderson, Livonia; Marvin H. Weintraub, Oak Park, both of Mich.

[73] Assignee: Ford Motor Company, Dearborn, Mich.

[21] Appl. No.: 833,328

[22] Filed: Sep. 14, 1977

[51] Int. Cl.² .............................................. F16D 69/02
[52] U.S. Cl. ........................................ 148/6; 148/6.27; 148/6.3; 427/11; 106/36; 260/38; 260/DIG. 39; 188/251 A
[58] Field of Search ........................... 148/6.27, 6.3, 6; 427/11; 106/36; 260/38, DIG. 39; 188/251 R, 251 A, 251 M, 218 R, 218 XL; 428/271, 443

[56] References Cited

U.S. PATENT DOCUMENTS

| | | | |
|---|---|---|---|
| 2,554,128 | 5/1951 | Spokes | 260/38 |
| 2,993,819 | 7/1961 | Nessim | 148/6.27 |
| 3,227,249 | 1/1966 | Kuzmick et al. | 260/38 |
| 3,371,756 | 3/1968 | Spitz | 188/251 M |
| 3,647,744 | 3/1972 | Rich et al. | 260/38 |

Primary Examiner—Ralph S. Kendall
Attorney, Agent, or Firm—William E. Johnson; Keith L. Zerschling

[57] ABSTRACT

A method of protecting an aluminum braking surface is disclosed. A brake lining associated with the surface is formed of a brake lining material which includes as a part of the composition an additive of sodium fluoride or cryolite. When a brake system composed of the braking surface and the brake lining are subjected to repeated braking actions, the additive of the brake lining reacts with a surface layer of the aluminum braking surface to form a tenacious, wear resistant layer thereon. The additive, upon further braking actions serves to maintain the wear resistant layer as fresh aluminum is exposed during normal wear of the braking surface over its useful life.

3 Claims, No Drawings

METHOD OF PROTECTING AN ALUMINUM BRAKING SURFACE

BACKGROUND OF THE INVENTION

The use of aluminum as a brake surface has not been known since no known friction material has been able to yield satisfactory performance in conjuction with an aluminum surface. Commercially available brake lining materials rubbing on an aluminum surface results in excessive aluminum wear rates and/or excessive brake lining wear rates.

The reason that aluminum wears rapidly or the lining used in conjunction therewith wears rapidly, is that the aluminum has a thin aluminum oxide layer thereon. This layer is hard and brittle and also has a low thermal expansion and thermal conductivity when compared to the base aluminum. High thermal fluxes are developed during braking operations. These thermal fluxes produce extremely high temperature "flashes" with locally high contact stresses between the brake lining material and the brake surface. These high temperature "flashes" have been found to fracture the aluminum oxide layer thereby providing hard, sharp cutting surfaces. These cutting surfaces cut into the brake lining material. The cutting of the lining in turn leads to irregular surfaces on the lining which tear out the small particles of aluminum oxide and some aluminum from the brake surface. These hard particles imbed themselves in the lining material and, in turn, cut into the aluminum brake surface. Consequently, both friction material and aluminum experience unacceptably high wear rates.

It is the object of this invention to provide a method for protecting a brake system which includes an aluminum brake and a brake lining.

It is another object of this invention to provide a method of protecting a brake system which includes an aluminum brake surface and a brake lining in which the cost of protection is relatively low and the protection provided remains over a substantial number of braking actions.

It is a further object of this invention to provide a method of protecting a brake system which includes an aluminum brake surface and a brake lining which is based on an asbestos formulation or a non-asbestos formulation.

SUMMARY OF THE INVENTION

This invention relates to a method of protecting a braking surface and, more particularly, to a method of protecting an aluminum braking surface of a braking system including the brake surface and a brake lining.

In accordance with the teachings of this invention, a method is provided for protecting an aluminum braking surface of a brake system which includes such a surface and a brake lining, and for using the brake system for a plurality of braking actions. The method has the following general steps therein. The braking surface of the braking system is formed from aluminum or a suitable aluminum-containing alloy. The brake lining is formed of a brake lining material which includes as a part of its composition an additive selected from the group consisting of sodium fluoride and cryolite ($Na_3AlF_3$). The brake system is subjected to repeated braking actions. These actions cause the additive of the brake lining to react with a surface layer of the aluminum braking surface to form a tenacious, wear resistant layer on the aluminum braking surface. The brake system is thereafter subjected to further braking actions in which the tenacious, wear resistant surface layer serves as a braking surface and as a self-healing, protective layer to protect freshly exposed aluminum as the braking surface wears over its useful life. The fresh aluminum reacts with the additive of the brake lining material to give the tenacious, wear resistant surface layer its self-healing characteristics.

The method of this invention can be used to protect braking surfaces which are associated with either asbestos-containing braking lining compositions or non-asbestos brake lining compositions.

DESCRIPTION OF THE PREFERRED EMBODIMENT

In U.S. Pat. No. 3,647,744 issued on Mar.7, 1972 for Friction Material Additives for Improved Performance, an automotive friction material is disclosed in which an alkali metal fluoride selected from the group consisting of lithium fluoride, sodium fluoride and potassium fluoride are used to increase the wear resistance of normal asbestos-containing brake lining materials. The brake lining disclosed therein was used in conjunction with cast iron braking surfaces. The patent also references U.S. Pat. No. 3,227,249 for its teaching of cryolite as a brake additive material. The 3,647,744 U.S. patent indicates that the materials suggested therein had superior characteristics for protecting the wear resistance of the lining material than the cryolite taught in the mentioned 3,227,249 U.S. patent. In the cases discussed in those patents, the wear resistance of the lining material was the thing that was protected.

We have now discovered that sodium fluoride and cryolite may be used to protect an aluminum braking surface if these materials are included as a portion of the brake lining materials. These materials are transferred from the brake lining during brake applications to react with the surface of the aluminum braking surface to form a tenacious, wear resistant layer on the aluminum which eliminates the aluminum oxide coating that would otherwise form on this surface. As the braking surface wears under normal use, additional amounts of this additive material are transferred from the brake lining material to keep generating the wear resistant, tenacious surface. Thus, by including the sodium fluoride or cryolite in the brake lining material, the tenacious, wear resistant layer developed on the aluminum is self-healing as the brake system wears.

The patents mentioned previously do not in any manner teach to one skilled in the art the fact that the selection of the cryolite and sodium fluoride would result in the protection of an aluminum braking surface by the formation of a tenacious, wear resistant, self-healing layer on the aluminum braking surface. We are unaware of any prior knowledge or disclosure that these two materials, when incorporated in a brake lining material, can develop such a protective layer on an aluminum braking surface.

Therefore, in accordance with the method of our invention, an aluminum braking surface of a brake system including the braking surface and a brake lining is protected and is usable for a plurality of braking actions in the following manner. The braking surface is made of aluminum. In this situation we mean aluminum or any alloys thereof which are suitable for use as an aluminum braking surface.

The brake lining associated with the brake system is formed from a brake lining material which includes as a part of the composition thereof an additive selected from a group consisting of sodium fluoride and cryolite. The addition of this material should be in the range of from 0.5 to 10.0 percentages by weight of these materials. The brake lining material may be the known asbestos-containing brake lining materials or the known non-asbestos brake lining materials. Since the formulations of the brake linings do not constitute a part of this invention, no further discussion thereof will be undertaken herein. Those skilled in the art are well aware of the many asbestos and non-asbestos brake lining compositions which are available. When these known materials are used with an aluminum braking surface, the addition of the desired amount of additive will provide the protective function which has been described herein.

The braking system is subjected to repeated braking actions. Under these braking actions, the additive of the brake lining reacts with a surface layer of the aluminum braking surface. This reaction eliminates the aluminum oxide and forms a tenacious, wear resistant layer on the aluminum braking surface.

The braking system is subjected to further braking actions. In this case, the tenacious, wear resistant surface layer serves as a braking surface. The surface also serves as a self-healing, protective layer to protect freshly exposed aluminum as the braking surface wears over its useful life. The surface layer is self-healing because the additive of the brake lining reacts with the freshly exposed aluminum to continue the development of the tenacious surface.

When the method of this invention is used, the wear associated with an aluminum braking surface is dramatically reduced. For example, in the situation where an asbestos-containing lining system with 7.5 percent of this sodium fluoride additive was compared with the same brake lining compositions not containing sodium fluoride, the difference in wear rate was greater than 50% faster for the non-additive combination.

There has been disclosed herein a method of protecting an aluminum braking surface. Many modifications of this concept will be apparent to those skilled in the art. It is intended that all such modifications fall within the scope of the appended claims.

What we claim is:

1. A method of protecting an aluminum braking surface of a brake system including a braking surface and a brake lining, and for using the system for a plurality of braking actions, which method comprises the steps of:
   forming the braking surface of the braking system from aluminum;
   forming the brake lining of a brake lining material which includes as a part of the composition thereof an additive selected from the group consisting of sodium fluoride and cryolite ($Na_3AlF_3$);
   subjecting the brake system to repeated braking actions whereby said additive of the brake lining reacts with a surface layer of said aluminum braking surface to form a tenacious, wear resistant layer on said aluminum braking surface; and
   further subjecting the brake system to braking actions in which said tenacious, wear resistant surface layer serves as a braking surface and as a self-healing, protective layer to protect freshly exposed aluminum as the braking surface wears over its useful life.

2. The method of claim 1 wherein said brake lining contains asbestos.

3. The method of claim 1 wherein said brake lining is asbestos-free.